Aug. 13, 1929.　　G. E. WEAVER ET AL　　1,724,813
TIRE REMOVING APPLIANCE
Filed June 22, 1928　　3 Sheets-Sheet 3

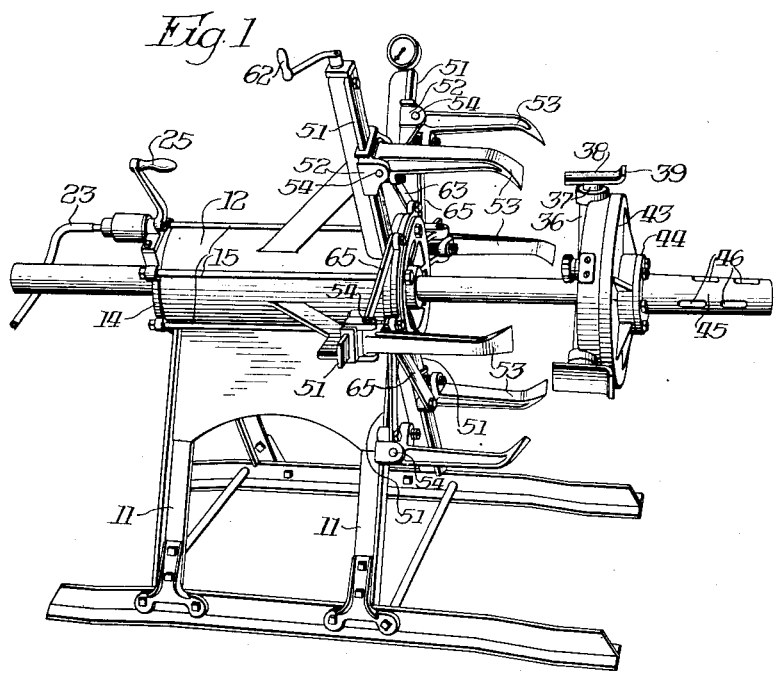
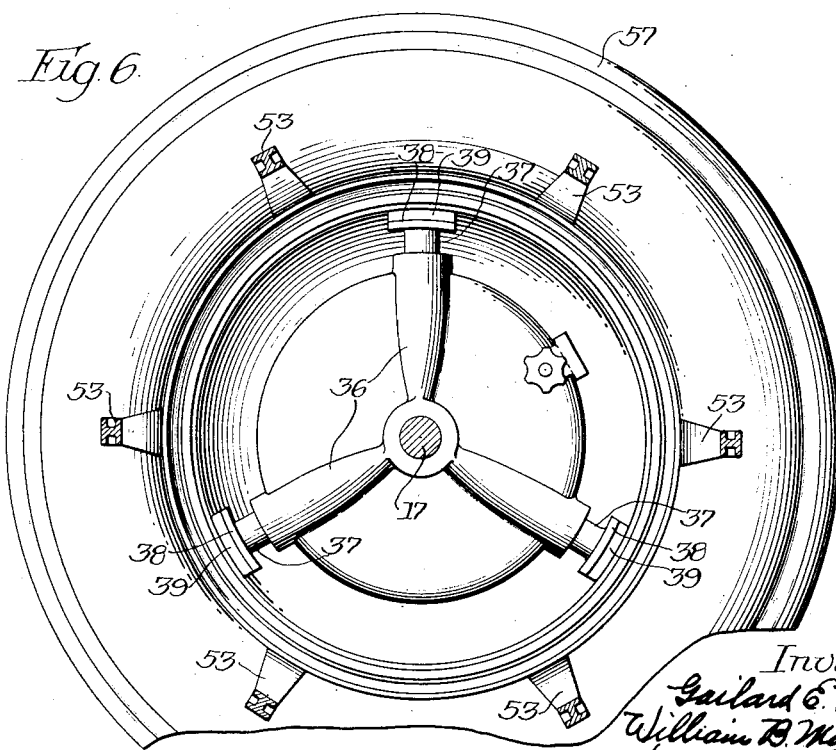

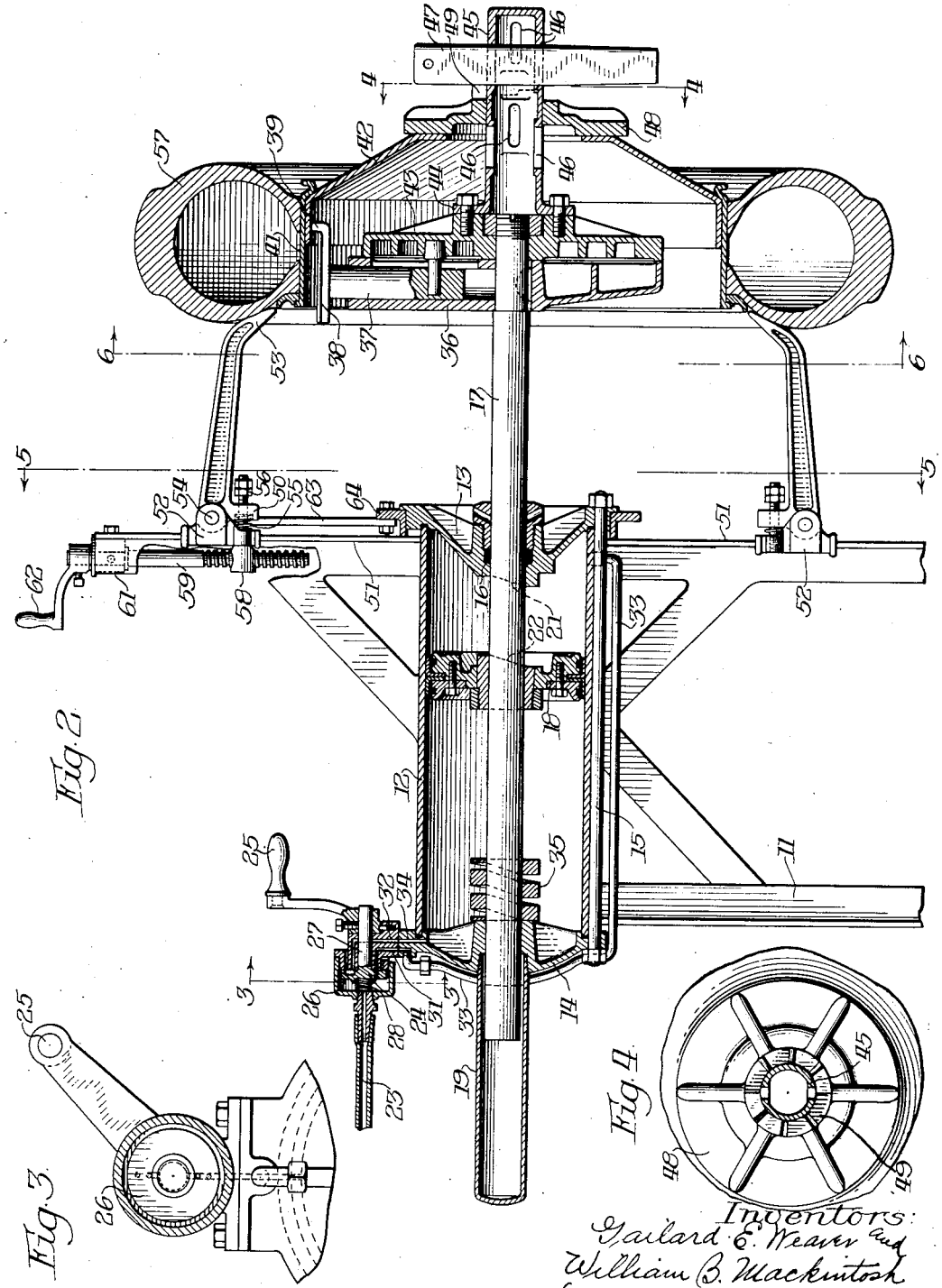

Patented Aug. 13, 1929.

1,724,813

UNITED STATES PATENT OFFICE.

GAILARD E. WEAVER AND WILLIAM B. MACKINTOSH, OF SPRINGFIELD, ILLINOIS, ASSIGNORS TO WEAVER MANUFACTURING COMPANY, OF SPRINGFIELD, ILLINOIS, A CORPORATION OF ILLINOIS.

TIRE-REMOVING APPLIANCE.

Application filed June 22, 1928. Serial No. 287,507.

The leading aim of the present invention is to provide a simple and effective machine for removing vehicle-wheel tires from their supporting rims, whether the latter are separable from, or permanently united to, their wheels.

The detachment of heavy truck and bus pneumatic tires from their rims presents a substantial problem unless efficient mechanical means are supplied to lend its aid in accomplishing the desired results.

Such tire-casings are ordinarily constructed so that their inside diameters allow them to slide freely and easily over the outside of the rim, but, in service, due to the air-pressure in the inner-tube, the toes or inner marginal portions of the tire-casing, and the inner-tube itself are pressed very firmly and tightly against the companion surface of the rim, with the result that such rubber members become rusted or cemented or "frozen" to the rim, necessarily requiring substantial force to effect their separation and the demounting of the tire.

Hence the prime purpose of this invention is to furnish simple means for effecting the quick and easy removal of the tire without injury to the latter.

In order that those acquainted with this art may fully understand the invention both from structural and functional standpoints, in the accompanying drawings, forming a part of this specification, and throughout the several views of which like reference characters have been used to denote the same parts, a present desirable and preferred embodiment of the invention has been illustrated in detail.

In these drawings:

Figure 1 is a perspective view of the apparatus;

Figure 2 is a central, longitudinal section on an enlarged scale through the new and improved machine;

Figure 3 is a small section through the compressed air valve on line 3—3 of Figure 2;

Figure 4 is a vertical cross-section on line 4—4 of Figure 2;

Figure 6 is a similar cross-section on line 6—6 of Figure 2.

Figure 5:
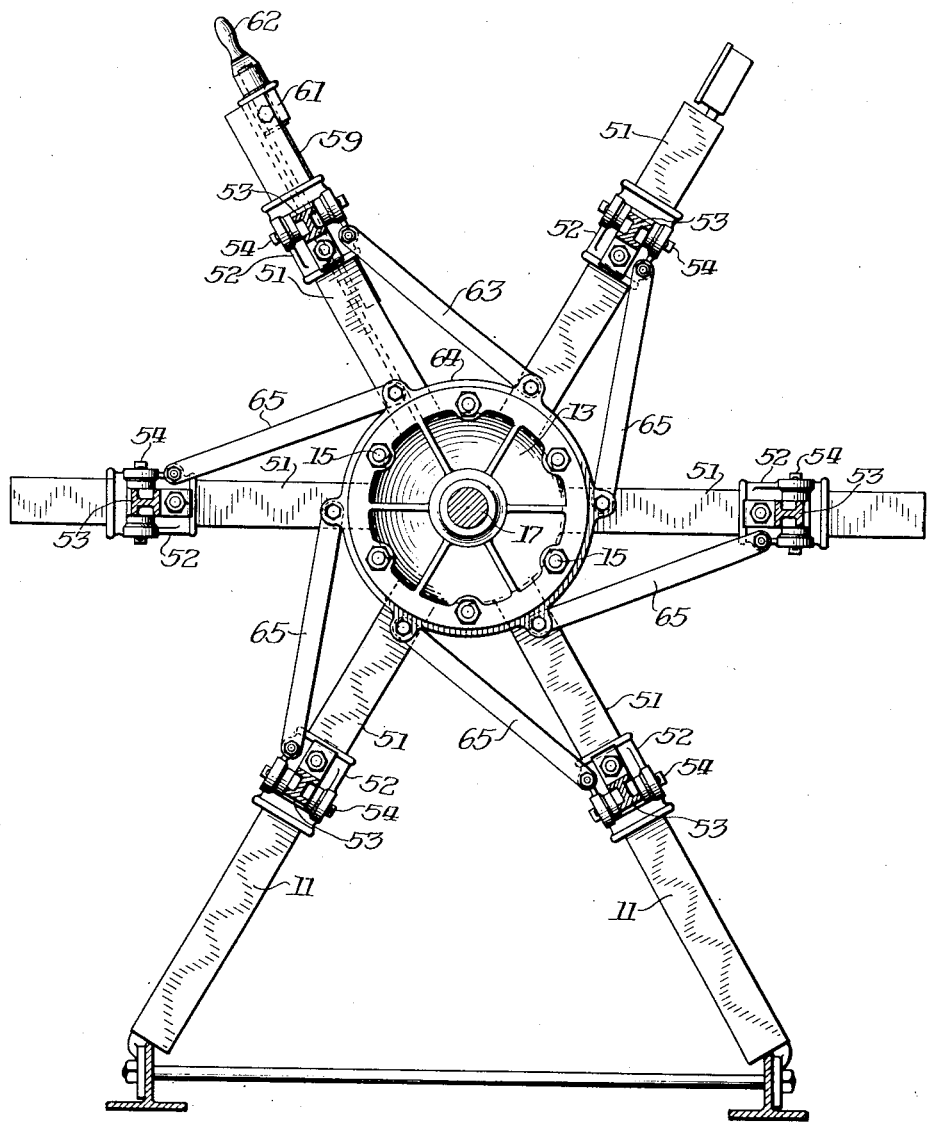
Figure 5 is an upright cross-section on line 5—5 of Figure 2.

Referring to these drawings, it will be observed that the novel and improved appliance includes a suitable frame 11 designed to rest on the floor and carrying a cylinder 12 equipped with front and rear cylinder-heads 13 and 14 respectively, held firmly on the ends of the cylinder by the usual plurality of longitudinal tie-rods or bolts 15, 15.

The end closure 13 is fitted with a suitable stuffing-box 16 through which reciprocates a piston-rod 17 having a piston or plunger 18 fastened thereto inside of the cylinder, such rod sliding through an aligned, central aperture in the opposite head 14, the rear protruding end of the rod being accommodated in an extension shell or tube 19 having an air-tight threaded connection with the part 14, thus obviating the need of a stuffing-box at this point.

As will be explained hereinafter, it is desirable to have the rod automatically assume a definite predetermined angular position when the piston is at the front end of the cylinder, and, accordingly, the inner surface of the head 13 is made sloping or bevelled at 21 and the correlated face 22 of the piston is formed slightly obliquely so that as the piston approaches and engages the head, the piston and its shaft will be rotated by the contacting inclined surfaces to bring the piston and shaft into, and to maintain them in, the required angular position.

Compressed air or other suitable fluid under pressure is supplied through a hose or pipe 23 to a hand-operated valve 24 equipped with an actuating handle 25, such valve having a valve proper 26 on the shaft 27 on which the handle 25 is fixed, the member 26 being held to its seat by a spring 28.

The two ports 31 and 32 of the valve casing are connected by appropriate conduits or passages 33 and 34 to the front and rear ends of the cylinder, as will be readily understood.

When the handle is turned to actuate the valve to admit compressed air into the head or right-hand end of the cylinder, the other end of the latter is connected through its port to the outer atmosphere, and, conversely, when air under pressure through the valve is introduced into the rear or left-hand end of the cylinder, the opposite end thereof is connected to the atmosphere.

Inasmuch as such valves are of ordinary and usual construction, its details need not here be further considered.

As is shown in Figure 2, a heavy shock-absorbing or cushion or compression spring 35 is interposed between the inner face of the rear cylinder-head and the piston, the spring surrounding the rod as has been depicted.

The front projecting portion of the piston-rod carries a three-arm expansion and contraction chuck characterized as a whole 36 and having a plurality of radially-disposed arms 37, 37 having heads or seats 38 at their outer ends with abutments or projections 39.

When said chuck is used with a rim, as distinguished from a rim on a wheel, the heads directly engage the inner surface of the rim and the latter is precluded or prevented from dislodgement by contact with the parts 39, but, when the chuck is employed with a rim 41 forming a part of a disc-wheel 42, as shown in Figure 2, the sections 39 bear directly on the rim or a portion of the wheel as shown.

The scroll disc 43, forming part of the chuck and revolubly mounted on the end of the piston-rod, is carried on the flanged end 44 of a hollow nose-piece 45 provided with a plurality of spaced, transverse slots 46 therethrough adapted to receive a wedge-blade 47 by means of which the scroll-element may be turned relatively to the other portion of the chuck structure to expand or contract the series or group of arms 37.

The appliance includes also an abutment plate or disc member 48 adapted to fit over the nose-piece and to bear against the adjacent face of the wheel-disc 42, and, in order that such member may properly cooperate with wheels of different kinds or types, its hub 49 has a stepped end surface with any section of which the wedge or tapered blade may coact to firmly hold the parts in correct relation to one another.

The machine frame includes a number, six in the present instance, of stationary, radiating arms 51, 51 of T-shape in cross-section, and each having a block 52 slidable lengthwise thereon and having a curved finger 53 hinged thereto at 54, each such finger having an inwardly-extended, apertured lug 50 through which a threaded rod carried by the block extends, a coiled spring 55 surrounding each such rod bearing at one end against the block and at the other end against the lug tending to rock the finger outwardly, which movement is limited or restricted by a locked nut 56 on the rod.

It will be observed that the free ends of the fingers are disposed inwardly nearer the axis of the tire 57 on the rim 41 than are their hinge pins 54, whereby when the fingers are engaged by the sliding tire they tend to rock or swing inwardly against the outwardly rocking tendency of their springs.

In order that the several fingers may be simultaneously adjusted inwardly or outwardly manually, one of the blocks or slides 52 has an extension 58 with a threaded hole therethrough to accommodate a screw-shaft 59 revoluble in a bearing 61 on the arm and supplied at its outer end with an operating handle 62.

Such particular block 52 is connected by a link 63 to a ring 64 oscillatory on the cylinder-head 13, such ring being similarly operatively joined to all of the other companion sliding blocks 52 by like links 65, 65, whereby the inward and outward travelling movements or adjustments of the one block, effected by the convenient handle 62, are transmitted in equal and like degree to all of the other associated blocks and their pivoted fingers.

The appliance is operated practically as follows:

The valve handle 25 is turned to allow compressed air to flow through the passages 32 and 34 into the rear portion of the cylinder, the valve 26 at the same time connecting the other end of the cylinder through the conduit 33 to the atmosphere, thereby causing the piston and its piston-rod to travel to the right as the parts are viewed in Figure 2.

When such piston engages the fixed, bevelled or cam surface 21 of the cylinder-head 13, continued forward travel of the piston will cause it to rotate until it can move no further in any direction, in which position of the parts one definite arm 37 of the chuck will be standing directly upright in which position of the chuck the rim and its tire or the rim and its tire and associated disc-wheel may be readily applied to the chuck, which is done at this time.

Then the wedge-blade 47 is inserted in any of the holes 46 and the nose piece 45 and the associated scroll-element 43 of the chuck are turned, the portion of the chuck carrying the arms being held from rotary movement by the engagement of the piston 18 with the head 13 as will be understood, to simultaneously extend all of the chuck arms to firmly and securely grasp or engage the inner face of the rim, the part 36 of the chuck and its correlated arms being not only prevented from rotary movement with the spiral chuck section by reason of the holding action which the cylinder-head 13 maintains on the piston 18 due to their rotary interlocked relation, but the chuck and the piston-rod cannot recede because the piston is held from backward movement by reason of the air pressure back of it.

Thereupon, the wedge-blade is removed, the abutment disc 48 applied over the nose-piece and turned to bring the proper portion of its stepped end into position, and the blade is driven into the correct hole to secure the disc of the wheel in firm and suitable connection with the piston-rod, all as is fully shown in Figure 2.

Handle 62 is then turned to expand or contract the several fingers until they are in suitable position to engage the side of the tire 57 correctly just about the side-flange or side-ring of the rim.

Then handle 25 is turned to admit compressed air into the front end of the cylinder through conduit 33 and to allow the escape of the air in the rear or left-hand portion of the cylinder to the atmosphere.

This causes the piston, its piston-rod, the chuck, its supported rim, tire and wheel, the abutment plate 48, the nose-piece 45 and the wedge-blade to travel to the left.

During the initial movement of the tire, its contact or engagement with the inturned, curved ends of the fingers, compels the latter to force their way in between the adjacent rim flange and the bead or toe portion of the tire-casing until they come into contact with the outer surface of the main portion of the rim which precludes their further inward swinging.

Thereafter, the fingers prevent movement of the tire with the rim, but the latter continues its travel and is forced out of the tire-casing while the latter is held stationary by the fingers.

As will be understood, this is contrary to the usual practice which forces the tire from the rim while the latter is held from movement.

The reason for adopting this reversal is that when the powerful machine ultimately breaks the more or less tenacious seal between the tire and the rim, if the tire were free to move, it would be projected off of the rim with considerable force and would doubtless be shot or thrown some distance from the machine with possible injury to bystanders and to the tire itself.

In view of the fact that the finger ends hug the rim during the exertion of the considerable force by the mechanism, the detachment of the tire from the rim is brought about without injury to the tire.

When the tire and rim are thus separated, the machine is suddenly freed from a substantial load, and, accordingly, when the piston at that time jumps or travels rapidly to the end of the cylinder, its movement is appropriately stopped or checked and the shock absorbed by the action of the cushion-spring.

The tire having been thus demounted or detached from the wheel and rim, they may be removed from the appliance in a manner well understood by taking out the blade, withdrawing the abutment plate, and contracting the chuck.

Obviously, the adjustments afforded for the chuck, abutment disc, and the fingers adapts the appliance for satisfactory use with rims and wheels of different sizes and different physical forms.

The invention is not necessarily limited and restricted to the precise and exact structure set forth and described, because it may be changed or modified in substantial degree without departure from the heart and essence of the invention and without the loss or sacrifice of any of its substantial benefits and advantages.

We claim:

1. In a machine for demounting tires, the combination of means to support a rim with its tire on the rim, a relatively stationary supporting member, a plurality of fingers hinged on said member and radially arranged with respect to the tire, the free ends of said fingers being disposed nearer the axis of the tire than their hinges, whereby the fingers tend to rock inwardly when the tire is moved toward them and to force themselves between the tire and rim, and means to move said supporting means toward said fingers whereby when movement of the tire is prevented by the fingers, the rim will continue its travel and be forced out of the tire so held against movement.

2. In a machine for demounting tires, the combination of means to support a rim and its tire, a supporting member, a plurality of fingers hinged on said member and radially arranged with respect to the supported tire, the free ends of said fingers being disposed nearer the axis of the tire than their hinges, whereby the fingers tend to rock inwardly when the tire is moved toward them and to force themselves between the tire and rim, springs tending to force said hinged fingers outwardly, stops to limit such outward rocking movements of the fingers, and means to move said supporting means toward said fingers, whereby when movement of the tire is prevented by the fingers, the rim will continue its travel and be forced out of the tire so held against movement.

3. In a machine for demounting tires, the combination of means to support a rim and its tire, a supporting member, a plurality of fingers hinged on said member and radially arranged with respect to the supported tire, the free ends of said fingers being disposed nearer the axis of the tire than their hinges, whereby the fingers tend to rock inwardly when the tire is moved toward them and to force themselves between the tire and rim, means to simultaneously adjust said fingers radially in and out, springs tending to force said hinged fingers outwardly, stops to limit such outward rocking movements of said fingers, and means to move said supporting means toward said fingers whereby when movement of the tire is prevented by the fingers, the rim will continue its travel and be forced out of the tire so held against movement.

4. In a machine for demounting tires from rims, the combination of a suitably-supported cylinder, a piston slidable in said cylinder, a piston-rod on which said piston is mounted and which extends outside of said cylinder, a shock-absorbing spring in said cylinder between the rear head of said cylinder and said piston, means to admit and discharge a fluid under pressure to and from both ends of said cylinder to cause the sliding of the piston and its rod in opposite directions, the inner surface of the front head of said cylinder and the opposed face of said piston having means to give the piston a definite angular relation to its axis when such head and cylinder are brought longitudinally into engagement by the sliding of the piston, an expansible and contractible chuck on the protruding portion of said rod to support a rim and its tire, a plurality of supports movable radially of said piston-rod, means to expand or to contract said supports simultaneously, a finger hinged to each of said supports and having a tire-engaging end disposed nearer the axis of said rod than its hinge-pin, springs acting on said fingers tending to rock them outwardly, and a stop for each of said fingers limiting such outward movement, whereby when the piston and its rod are slid toward the rear cylinder-head, the fingers will engage the side of the tire on the rim supported by the chuck and rock inwardly by movement of the tire to force themselves between the tire and rim flange, the rim being forced out sidewise from the tire thus held from further movement by such fingers.

5. In a machine for demounting tires from rims, the combination of a cylinder, a piston slidable in said cylinder, a piston-rod on which said piston is mounted, means to admit a fluid under pressure into said cylinder and to permit the discharge of fluid therefrom to effect the reciprocations of said piston and piston-rod, an expansible and contractible chuck on a portion of said piston-rod outside of said cylinder, a transversely-apertured nose-piece revoluble on said piston-rod, an abutment-disc adapted to fit over said nose-piece and to engage the side of a wheel, the rim portion of which is mounted on said chuck, and a wedge-blade adapted to fit in said aperture to hold said disc in wheel-engaging position.

6. In a machine for demounting tires from their rims, the combination of a cylinder, a piston slidable in said cylinder, a piston-rod on which said piston is mounted, means to admit a fluid under pressure into said cylinder and to permit the discharge of fluid therefrom to effect the reciprocations of said piston and piston-rod, a two-part expansible and contractible chuck one part of which is fixed to a portion of said piston-rod extended out of said cylinder, a transversely-apertured nose-piece revoluble on said piston-rod and to which the second part of said chuck is fastened, an abutment-disc having stepped surfaces adapted to fit over said nose-piece to engage the side of a wheel, the rim portion of which is mounted on said chuck, and a wedge-blade adapted to fit in said aperture to turn said nose-piece and chuck part to expand or to contract said chuck and to bear against a selected one of said stepped surfaces to hold said disc in wheel-engaging position.

7. In a machine for demounting tires from their rims, the combination of a cylinder and its cylinder-heads, a piston reciprocatory in said cylinder, a piston-rod projecting out of said cylinder on which said piston is fixed, means to admit fluid into and to discharge it from said cylinder to effect the reciprocations of said piston and piston-rod, means mounted on the protruding portion of said piston-rod to support a rim, and means to assure a predetermined angular position of said rim-supporting means when said piston is at substantially one end of its stroke in said cylinder.

8. In a machine for demounting tires from their rims, the combination of a cylinder and its cylinder-heads, a piston reciprocatory in said cylinder, a piston-rod projecting out of said cylinder on which said piston is fixed, means to admit fluid into and to discharge it from said cylinder to effect the reciprocations of said piston and piston-rod, means mounted on the protruding portion of said piston-rod to support a rim, and coacting means on one cylinder-head and said piston causing the latter to assume a definite angular position with reference to its axis during the last portion of its stroke in one direction.

9. In a machine for demounting tires from their rims, the combination of a cylinder and its cylinder-heads, a piston reciprocatory in said cylinder, a piston-rod projecting out of said cylinder on which said piston is fixed, means to admit fluid into and to discharge it from said cylinder to effect the reciprocations of said piston and piston-rod, means mounted on the protruding portion of said piston-rod to support a rim, one cylinder head and said piston having oblique contacting surfaces causing the piston to assume a definite angular position with reference to its axis during the last portion of its stroke in one direction.

In witness whereof we have hereunto set our hands and seals.

GAILARD E. WEAVER.
WILLIAM B. MACKINTOSH.